United States Patent
Mahajan et al.

(10) Patent No.: US 10,922,463 B1
(45) Date of Patent: Feb. 16, 2021

(54) USER DIALOG-BASED AUTOMATED SYSTEM DESIGN FOR PROGRAMMABLE INTEGRATED CIRCUITS

(71) Applicant: Xilinx, Inc., San Jose, CA (US)

(72) Inventors: Akhilesh Mahajan, Hyderabad (IN); K. Nithin Kumar, Bangalore (IN); Yashwant Dagar, Mahendergarh (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/658,123

(22) Filed: Oct. 20, 2019

(51) Int. Cl.
*G06F 30/00* (2020.01)
*G06F 30/34* (2020.01)
*G06F 30/347* (2020.01)
*G06F 115/08* (2020.01)

(52) U.S. Cl.
CPC ............ *G06F 30/34* (2020.01); *G06F 30/347* (2020.01); *G06F 2115/08* (2020.01)

(58) Field of Classification Search
CPC .... G06F 30/34; G06F 2115/08; G06F 30/347; G06N 20/00
See application file for complete search history.

(56) References Cited

U.S. PATENT DOCUMENTS

| | | | | |
|---|---|---|---|---|
| 4,648,044 A * | 3/1987 | Hardy | ...................... | G06N 5/04 706/60 |
| 4,658,370 A * | 4/1987 | Erman | ................... | G06N 5/022 706/60 |
| 5,146,583 A * | 9/1992 | Matsunaka | ............. | G06F 30/30 716/103 |
| 5,197,016 A * | 3/1993 | Sugimoto | ............... | G06F 30/39 716/55 |
| 5,388,188 A * | 2/1995 | Selfridge | ................ | G06F 30/00 706/45 |
| 5,488,732 A * | 1/1996 | Ryu | ....................... | G06N 5/022 |
| 5,519,633 A * | 5/1996 | Chang | .................. | H05K 3/0005 716/102 |
| 6,961,918 B2 * | 11/2005 | Garner | .................... | G06F 30/30 716/139 |

(Continued)

OTHER PUBLICATIONS

"Bayou: Program Synthesis Powered by Bayesian Machine Learning—Program Synthesis Powered by Bayesian Sketch Learning," [online] Department of Computer Science, Rice University, as part of the DARPA Pliny project, (DARPA MUSE Award #FA8750-14-2-0270), retrieved Sep. 13, 2019, retrieved from the Internet: <https://info.askbayou.com/>, 2 pg.

(Continued)

*Primary Examiner* — Naum Levin
(74) *Attorney, Agent, or Firm* — Kevin T. Cuenot

(57) ABSTRACT

Automated system design for a programmable integrated circuit (IC) includes conducting, using computer hardware, a dialogue with a user, wherein the dialogue describes a user design for the programmable IC, extracting, using the computer hardware, a first plurality of features for the user design from the dialog, and generating, using the computer hardware, a design specification for the user design based on the first plurality of features. Using the computer hardware, a device configuration for the user design is generated based on the design specification. The device configuration is loadable within the programmable IC to implement the user design.

20 Claims, 9 Drawing Sheets

(56) References Cited

U.S. PATENT DOCUMENTS

| | | | | |
|---|---|---|---|---|
| 7,203,842 | B2 * | 4/2007 | Kean | G06F 12/1408 |
| | | | | 711/E12.092 |
| 8,156,453 | B1 * | 4/2012 | Nozarian | G06F 30/30 |
| | | | | 716/100 |
| 8,225,259 | B1 * | 7/2012 | Mendel | H03K 19/177 |
| | | | | 716/116 |
| 8,522,180 | B1 * | 8/2013 | Ng | G06F 30/30 |
| | | | | 716/110 |
| 10,192,016 | B2 | 1/2019 | Ng et al. | |
| 10,295,594 | B2 * | 5/2019 | Kourfali | G01R 31/31704 |
| 10,558,778 | B2 * | 2/2020 | Green | G06Q 10/063 |
| 10,657,296 | B2 * | 5/2020 | Iorio | G06F 16/24578 |
| 2002/0116161 | A1 * | 8/2002 | Freeman | G06F 30/00 |
| | | | | 703/13 |
| 2003/0028408 | A1 * | 2/2003 | RuDusky | G06Q 30/02 |
| | | | | 705/80 |
| 2004/0044970 | A1 * | 3/2004 | Anderson | G06F 30/34 |
| | | | | 716/102 |
| 2005/0021314 | A1 * | 1/2005 | Rose | G06F 30/00 |
| | | | | 703/1 |
| 2006/0190882 | A1 * | 8/2006 | Fong | G06F 30/3312 |
| | | | | 716/102 |
| 2006/0230377 | A1 * | 10/2006 | Rapp | G06F 15/8053 |
| | | | | 716/102 |
| 2018/0285517 | A1 * | 10/2018 | Reichental | G06F 30/17 |

OTHER PUBLICATIONS

Kapre, N. et al., "Driving Timing Convergence of FPGA Designs through Machine Learning and Cloud Computing," In 2015 IEEE 23rd Annual International Symposium on Field-Programmable Custom Computing Machines, May 2, 2015, pp. 119-126, IEEE.

* cited by examiner

300

ADS: Hello. Do you have a design requirement?

User: Yes

ADS: Please specify the device family, device name, and/or board for which you want a design.

User: ZCU111

ADS: Do you want any PL peripherals in your design?

User: Yes

ADS: Please specify the peripheral that you want to be enabled in the Zynq MP PS.

User: SPI

ADS: Please provide your email address to which the generated design can be sent.

FIG. 3

USER DIALOG-BASED AUTOMATED SYSTEM DESIGN FOR PROGRAMMABLE INTEGRATED CIRCUITS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to automated system design for programmable ICs.

BACKGROUND

A programmable integrated circuit (IC) refers to a type of device that includes programmable logic. An example of a programmable device or IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs).

Some modern programmable ICs have evolved to include programmable logic in combination with one or more other subsystems. For example, some programmable ICs have evolved to include programmable logic in combination with a hardwired processor. This class of programmable IC is often referred to as a System-on-Chip or "SoC." Other varieties of SoCs may include additional and/or different subsystems in combination with programmable logic.

SUMMARY

In one aspect, a method includes conducting, using computer hardware, a dialogue with a user, wherein the dialogue describes a user design for a programmable integrated circuit, extracting, using the computer hardware, a first plurality of features for the user design from the dialog, and generating, using the computer hardware, a design specification for the user design based on the first plurality of features. The method also includes generating, using the computer hardware, a device configuration for the user design based on the design specification. The device configuration is loadable within the programmable integrated circuit to implement the user design.

In another aspect, a system includes a processor configured to initiate operations. The operations include conducting a dialogue with a user, wherein the dialogue describes a user design for a programmable integrated circuit, extracting a first plurality of features for the user design from the dialog, and generating a design specification for the user design based on the first plurality of features. The operations also include generating a device configuration of the user design based on the design specification, wherein the device configuration is loadable within the programmable integrated circuit to implement the user design.

In another aspect, a computer program product includes a computer readable storage medium having program code stored thereon. The program code is executable by a processor to perform operations. The operations include conducting a dialogue with a user, wherein the dialogue describes a user design for a programmable integrated circuit, extracting a first plurality of features for the user design from the dialog, and generating a design specification for the user design based on the first plurality of features. The operations also include generating a device configuration of the user design based on the design specification, wherein the device configuration is loadable within the programmable integrated circuit to implement the user design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 illustrates an example dialogue between a user and the system of FIG. 1.

DETAILED DESCRIPTION

Figure 1:
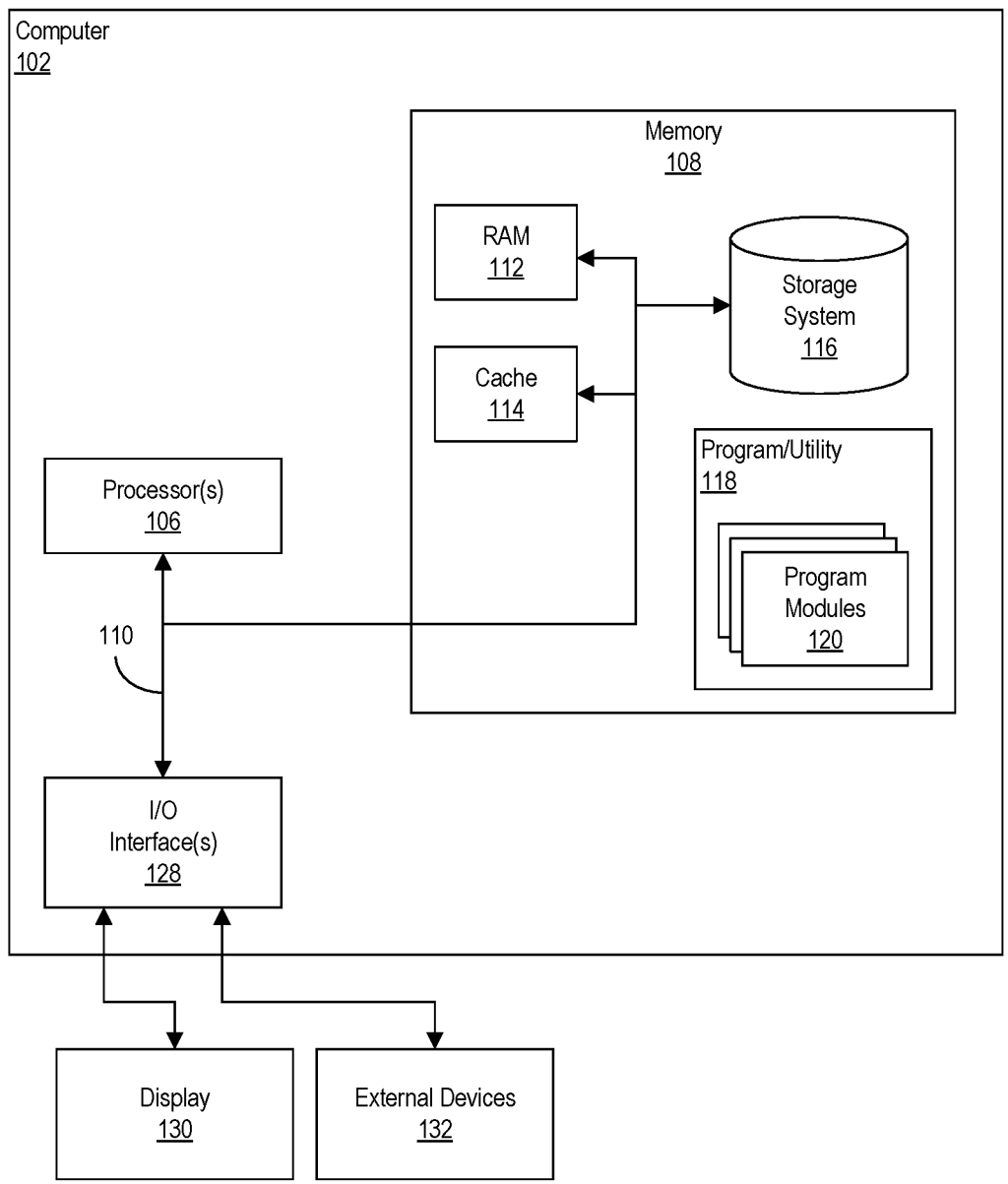
FIG. 1 illustrates an example of an automated design system for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to automated system design for programmable ICs. In the conventional case, users face a steep learning curve to create circuit designs for implementation in programmable ICs. Doing so requires that the user possess a variety of different skills. For example, to create a circuit design for use in a device that includes both programmable logic and a processor, the user likely requires some proficiency with hardware description languages or register transfer level (RTL) design, timing analysis and closure, board support packages (libraries and/or drivers for the lowest layer of an application stack for the device), first stage boot loaders, low level software programming, boot flows, and debugging and/or troubleshooting.

Development for a programmable IC may also require the user to utilize multiple different design tools. The user may need to utilize a particular design tool for designing for the programmable logic (e.g., a hardware design tool), a different design tool (e.g., a software development kit) for developing operational software for the processor, and a device that is capable of programming the actual programmable IC. In many cases, the memory requirements and central processing unit (CPU) usage of the design tools is high, sometimes requiring a server to execute.

In accordance with the inventive arrangements described within this disclosure, a user design for implementation in a programmable IC may be created automatically with little user involvement. Rather than the user manually operating one or more different design tools, the user may engage in a dialogue with an automated design system. The automated design system may include interactive capabilities to carry on a dialogue with the user relating to the desired user design. The automated design system is capable of extracting implementation information for the user design from the dialog. The automated design system is capable of formulating a design specification from the extracted information and initiating operation of one or more of the design tools to create a device configuration that implements the user design within the programmable IC. The user's involvement in the process may be limited to engaging in the dialogue with the automated design system.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an automated design system (system) 100 for use with the inventive arrangements described within this disclosure. System 100 includes a computer 102. The components of computer 102 may include, but are not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 102 typically includes a variety of computer readable media. Such media may be any available media that is accessible by computer 102 and may include any combination of volatile media, non-volatile media, removable media, and/or non-removable media.

Memory 108 may include computer readable media in the form of volatile memory, such as random-access memory (RAM) 112 and/or cache memory 114. Computer 102 may also include other removable/non-removable, volatile/non-volatile computer system storage media. By way of example, storage system 116 may be provided for reading from and writing to a non-removable, non-volatile magnetic media typically called a "hard drive." Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces.

Memory 108 may include at least one computer program product having a set (e.g., at least one) of program modules (e.g., program code) that are configured to carry out the functions and/or operations described within this disclosure. For example, memory 108 may include a program/utility 118 having a set (at least one) of program modules 120. Program modules 120 may include, but are not limited to, an operating system, one or more application programs (e.g., user applications), other program modules, and/or program data stored in memory 108. Program modules 120 generally carry out the functions and/or methodologies as described herein at least with respect to operations performed by computer 102.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 102 may include one or more Input/Output (I/O) interfaces 128 communicatively linked to bus 110. I/O interface(s) 128 allow computer 102 to communicate with display 130 and/or other devices such as external devices 132. Examples of I/O interfaces 128 may include, but are not limited to, network cards, modems, network adapters, hardware controllers, etc. External devices 132 may include devices configured to allow computer 102 to interact with users (e.g., a microphone and/or speaker), communicate with other computing devices, and the like. Computer 102 also may be coupled to other external devices such as a keyboard (not shown) via I/O interface(s) 128.

In one aspect, computer 102 is capable of conducting a dialogue with a user. In conducting the dialogue, computer 102 is capable of, in the context of the dialogue (e.g., during the dialog), querying the user, receiving responses from the user, responding to responses from the user, and extracting features of a design the user wishes to implement within a programmable IC (referred to herein as the "user design"). As used herein, a "dialogue" means a conversation, whether written or oral, between a user and a computer-based system such as system 100. Computer 102 is capable of generating a design specification from the extracted features. Computer 102 further is capable of directing execution of one or more design tools using the design specification to generate a device configuration for the user's design. The device configuration specifies the particular file or files that are loadable into the programmable IC. For example, the device configuration includes one or more binary files that, when loaded into the programmable IC, physically implement the user design therein.

An example architecture for a programmable IC for which the device configuration may be used is described in connection with FIG. 10. The programmable IC includes programmable logic. The programmable IC may also include a processor system having one or more functional units (e.g., I/O and/or peripherals). The user design may be one that uses both the programmable logic and an application executing in the processor system. Alternatively, the user design may be one that uses only the processor system executing an application without configuring the programmable logic. Still, in both types of user designs, hardware development is required. In particular, in cases where the user design only has an application executing on the processor system and does not use the programmable logic, any functional units in the processor system (e.g., I/O and/or peripherals) are still enabled via a hardware design flow that is typically performed for the programmable logic.

FIG. 1 is not intended to suggest any limitation as to the scope of use or functionality of the examples described herein. System 100 is an example of computer hardware (e.g., a system) that is capable of performing the various operations described within this disclosure. System 100 is shown in the form of a computing device, e.g., a computer or server. System 100 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using system 100 or other suitable data processing system, generally support the Field Programmable Gate Array (FPGA)-as-a-Service (FaaS) model. In the FaaS model, user functions are hardware accelerated as circuit designs implemented within programmable ICs operating under control of the (host) data processing systems. Other examples of cloud computing models are described in the National Institute of Standards and Technology (NIST) and, more particularly, the Information Technology Laboratory of NIST.

System 100 is operational with numerous other general-purpose or special-purpose computing system environments or configurations. Examples of computing systems, environments, and/or configurations that may be suitable for use with system 100 include, but are not limited to, personal computer systems, server computer systems, thin clients, thick clients, hand-held or laptop devices, mobile devices, multiprocessor systems, microprocessor-based systems, set top boxes, programmable consumer electronics, network PCs, minicomputer systems, mainframe computer systems, and distributed cloud computing environments that include any of the above systems or devices, and the like. System 100 may operate as one or more of the example devices described or may operate as a server in relation to one or more of the example devices described wherein such devices function as clients.

System 100 is also an example implementation of an Electronic Design Automation (EDA) system. Program modules 120, for example, may include software, e.g., design tools, capable of performing a hardware design flow (e.g., synthesis, placement, routing, and/or bitstream generation), a software design flow, and/or an application design flow. In one aspect, program modules 120 may include a chatbot, a user interface, a natural language processor (NLP), and an artificial intelligence (AI) engine. Further details of the software architecture that may executed by system 100 are described in connection with FIG. 2.

Figure 2:
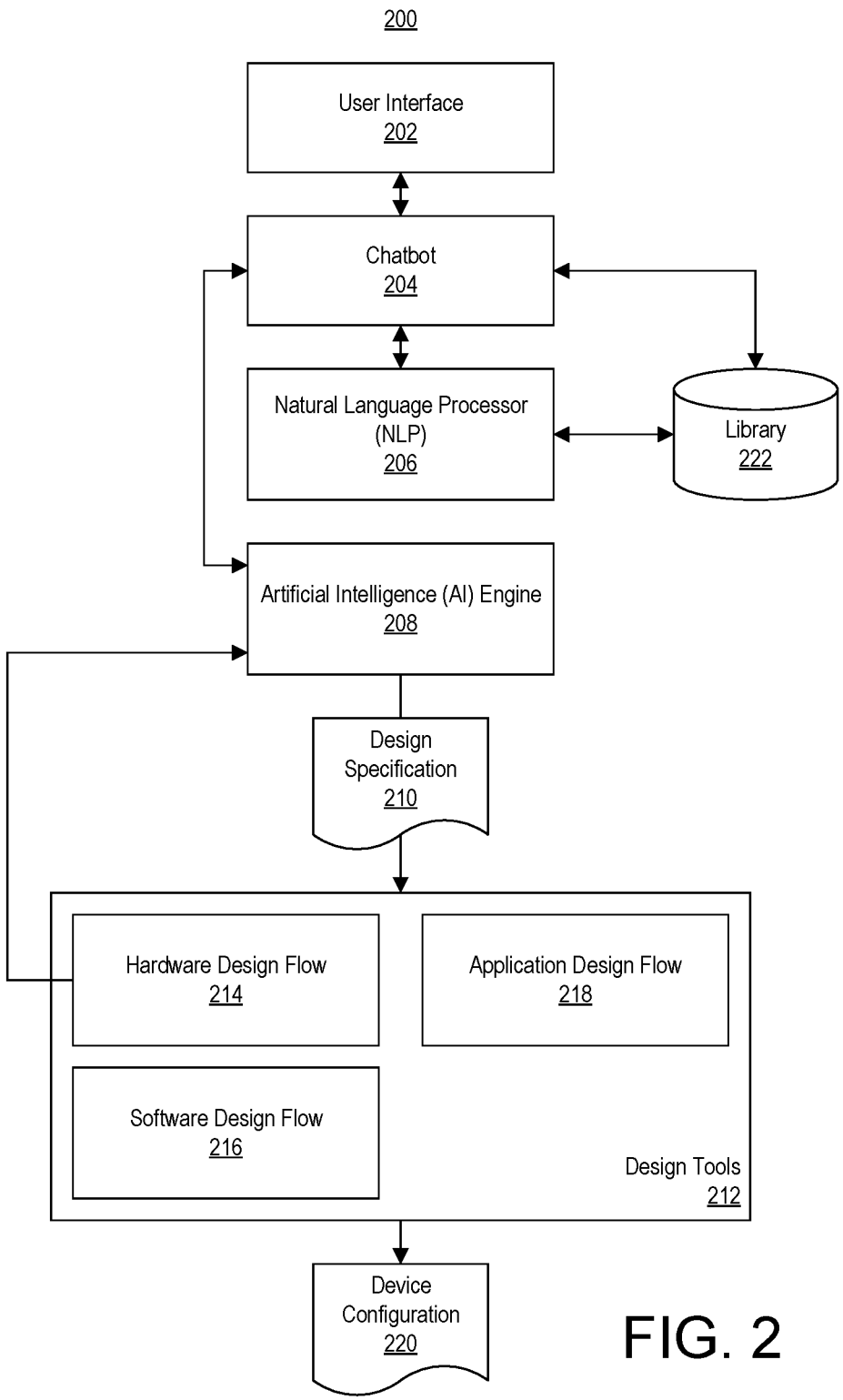
FIG. 2 illustrates an example software architecture that is executable by the system of FIG. 1.

FIG. 2 illustrates an example software architecture 200. Software architecture 200 may be included in, and executed by, the system described in connection with FIG. 1, another suitable computer, or combination of computer/communication systems. Software architecture 200 includes a user interface 202, a chatbot 204, an NLP 206, and an AI engine 208. Software architecture 200 also may include one or more design tools 212. In the example of FIG. 2, user interface 202, chatbot 204, NLP 206, AI engine 208, and design tools 212 may be implemented as program modules 120.

User interface 202 is configured to allow a user to interact with the system. Through user interface 202, a user may conduct a dialogue with the system. In the example of FIG. 2, user interface 202 and chatbot 204 execute in the same computer system. In other examples, user interface 202 may execute in a different system or device than chatbot 204. For example, user interface 202 may execute in a mobile device, a personal computer, a tablet, or the like.

In one example, user interface 202 is implemented as a chat client. The chat client is capable of receiving text input specified in natural language from a user and displaying, to the user, text responses generated by the system. The chat client may be implemented in accordance with the client-server model where chatbot 204 effectively operates as the server with user interface 202 operating as the client.

In another example, user interface 202 is implemented as a speech-based user interface. In that case, the user interface may include a speech recognition engine capable of converting user spoken utterances to text. The user spoken utterances may be received via a microphone or other audio interface operatively coupled to user interface 202. User interface 202 may also include a text-to-speech engine that is capable of generating speech from text generated by chatbot 204. In other implementations, user interface 202 may be implemented using a combination of a chat client, a speech recognition engine, and/or a text-to-speech engine.

Chatbot 204 is capable of simulating how a human being would behave as a conversational partner for the user during the dialogue. As such, chatbot 204 is capable of conducting a conversation, e.g., the dialogue, with the user. Chatbot 204 may be trained, for example, on a domain specific conversation dataset so that chatbot 204 is capable of making context specific conversation with the user. Chatbot 204 receives user input in the form of text (e.g., alphanumeric and/or symbols) from user interface 202 and generates text responses to the received inputs. Chatbot 204 provides the responses to user interface 202 for presentation (e.g., display or playback) to the user.

In one aspect, chatbot 204 is communicatively linked with NLP 206. Chatbot 204 is capable of providing text received from user interface 202 to NLP 206. Natural Language Processing is a field of computer science, artificial intelligence, and computational linguistics which implements computer processes (e.g., an NLP) to facilitate interactions between computer systems and human (natural) languages. Natural language processing enables computers to derive computer-understandable meaning from natural language input. The International Organization for Standardization (ISO) publishes standards for natural language processing, one such standard being ISO/TC37/SC4. As part of natural language processing, semantic analysis may be performed. Semantic analysis may follow parsing and involve extraction of context-independent aspects of a sentence's meaning, including entities, named entities, the semantic roles of entities mentioned in the sentence, tone analysis (e.g., for determining emotive content), sentiment analysis, and quantification information, such as cardinality, iteration, and dependency.

In one aspect, NLP 206 is trained to parse user specified text relating to system design. NLP 206, for example, may be trained on terminology and/or corpuses of text relating to a user design for a programmable IC; creation and implementation of a user design within a programmable IC; acceptable commands, operands, and parameters for the design tools 212; and/or particular technologies relating to cores included in library 222 and/or other technologies (e.g., software development) that may be needed to generate a device configuration for the programmable IC.

In one aspect, NLP 206 is communicatively linked with a library 222. In certain implementations, chatbot 204 may also be communicatively linked with library 222. Library 222 may be a database or other data structure that includes one or more cores and corresponding descriptions of the functionality of the cores. The descriptions, for example, may include human readable text (e.g., natural language), keywords, tags, and/or the like describing the cores.

As defined herein, the term "core" means a pre-designed and reusable unit of logic, cell, or chip layout design in the field of electronic circuit design. A core, sometimes referred to as an "Intellectual Property (IP) Core" or "IP," is expressed as a data structure specifying a description of hardware that performs a particular function. A core may be expressed using hardware description language file(s), as a netlist, as a bitstream that programs a programmable IC, or the like. A core may be used as a building block within circuit designs adapted for implementation within an application-specific integrated circuit (ASIC), a programmable IC, e.g., an FPGA, System-on-Chips (SoCs), and/or other type of IC.

A core further may include additional resources such as source code (e.g., high-level language programming code implementations of functions), high-level programming language models, schematics, documentation, and the like. Examples of different varieties of cores include, but are not limited to, digital signal processing (DSP) functions, memories, storage elements, math functions, etc. Some cores include an optimally floorplanned layout targeted to a specific family of ICs. Cores also may be parameterizable in that a user may enter parameters to activate or change certain functionality of a core.

Accordingly, NLP 206 is capable of extracting the types of information described above (e.g., intentions, meaning, sentiment, etc.) from text provided from chatbot 204 and providing such information back to chatbot 204. Chatbot 204 is capable of generating responses based, at least in part, on the information obtained from NLP 206. Chatbot 204 further is capable of extracting features of the particular user design that is the subject of the dialogue conducted between the user and the system based, at least in part, on the information obtained from NLP 206. In one aspect, chatbot 204 is capable of communicating directly with AI engine 208 rather than communicate through NLP 206.

In another aspect, NLP 206 may be omitted from software architecture 200. In that case, chatbot 204 may be trained to detect certain keywords. The keywords may be words and/or phrases considered to be features of a user design that is the subject of the dialogue. In such an implementation, chatbot 204 may communicate directly with AI engine 208 and/or library 222.

Chatbot 204 is capable of outputting the features extracted from the dialogue with the user and providing the features to AI engine 208. AI engine 208 is capable of generating a design specification 210 from the received features. In one aspect, design specification 210 is implemented as one or more scripts that may be generated from the extracted features. The script(s) may also specify one or more strategies (e.g., configuration parameters) for controlling design tools 212. AI engine 208 further is capable of incorporating feedback from previous runs of design tools 212 to generate updated configuration parameters usable by design tools 212 to improve timing of the user design and other design-related issues.

In one example implementation, library 222 includes a set of scripting codes corresponding to each core in library 222. The scripting codes may specify the default configuration (e.g., value) of each parameter (e.g., all parameters) of each core included in library 222. AI engine 208 is capable of receiving the extracted features from chatbot 204. The features specify one or more cores and values of any customizable parameters of such cores. Accordingly, AI engine 208 is capable of looking up the scripting codes for each core, as specified by the extracted features, from within library 222. AI engine 208 may include the scripting code(s) for each core within the user design (e.g., a file corresponding to the user design being created). Further AI engine 208 may replace any default values of parameters for each such core with parameters specified by the extracted features. The result is a script or scripts (e.g., design specification 210) specifying each core and the configuration of each such core for the user design.

If cores for the programmable logic are not present in the user design, then no interconnections between cores are required. In that case, the script(s) may serve as the source for generation of the hardware design for hardware design flow 214 (e.g., as performed using a hardware design tool). If one or more cores for the programmable logic are present, interconnections between the cores are required. The hardware design tool is capable of automatically implementing interconnections between the cores. The hardware design tool, for example, is capable of automatically connecting ports of the cores based on port compatibility, knowledge of the cores, and the extracted features which may or may not specify a particular type of data processing pipeline (e.g., where a pipeline indicates one or more operations, circuit blocks, and/or functions to be performed).

If the hardware design tool is unable to make all connections automatically, e.g., unable to establish connections for a selected core, in another example, the hardware design tool may be configured to use an example design that includes the selected core, as a reference. The hardware design tool is capable of creating connections between the selected core and other cores of the user design that mimic the connections found in the example design.

In another example implementation, AI engine 208 is capable of performing automatic code generation to generate the script(s). In that case, AI engine 208 automatically generates the script(s) instead of maintaining a library of scripting codes. In such an implementation, AI engine 208 uses extracted features and generates scripting code that may be used directly by design tools 212. AI engine 208, for example, may use case-based reasoning, routine design, template-based programming, and/or some form of artificial neural network to generate the script(s).

In still another aspect, AI engine 208 is implemented to use machine learning to generate design specification 210. For example, AI engine 208 may use or include an artificial neural network for processing received features to generate design specification 210. Features may be provided to AI engine 208 as a feature vector corresponding to a particular user design. AI engine 208, based on the features extracted from the dialogue, is capable of determining which cores of library 222 are to be used in the user design (e.g., if any), connectivity among the cores, and any dependencies between cores that may exist based on the particular programmable IC and/or circuit board specified by the user as part of the dialogue. The cores within library 222 may be used to implement circuitry within the programmable logic of the programmable IC and/or to configure particular functional units included in the processor system of the programmable IC.

AI engine 208 is capable of generating and outputting design specification 210. As discussed, in one aspect, design specification 210 is implemented as one or more scripts that, when executed, are capable of controlling design tools 212. For example, the script(s), when executed, cause design tools 212 to perform operations including, but not limited to, a hardware design flow 214 as performed by a hardware design tool, a software design flow 216 as performed by a software design tool, and/or an application design flow 218 as performed by an application design tool, each for a particular programmable IC (e.g., the "target programmable IC") and/or circuit board determined from the dialogue.

In another aspect, AI engine 208 is capable of using a machine learning strategy to generate parameters that may be used by design tools 212 (e.g., the hardware design tool) for timing convergence of the user design. Using Bayesian learning or an artificial neural network, for example, AI engine 208 is capable of generating configuration parameters for use by the hardware design tool of design tools 212 that configure the hardware design tool to implement one or more selected timing closure strategies.

In any case, in response to design specification 210 being generated, a shell script may be executed that starts design tools 212 and executes design specification 210. The shell script may also parse the configuration parameters to guide operation of design tools 212 through individual steps or stages of the hardware design.

Hardware design flow 214 refers to operations relating to processing the portion of the user design that is to be implemented in programmable logic of the target programmable IC. As noted, hardware design flow 214 also enables certain functional units (e.g., peripherals such as I/O controllers and the like) that are included in the processor system and coupled to processors included therein. An example of a functional unit is a Universal Asynchronous Receiver Transmitter (UART) or a Universal Serial Bus (USB) Controller. Software design flow 216 refers to operations relating to creating operational program code (e.g., operating system and/or boot related program code) that may be executed by the processor system of the programmable IC. Application development flow 218 refers to operations relating to creating an executable version of a user application to be executed by the processor system of the programmable IC.

Design tools 212, operating under control of the system and design specification 210, generate device configuration 220. As defined within this disclosure, the term "device configuration" is the data that is loaded into the programmable IC to physically implement a user design therein. The device configuration may include one or more files, e.g., binaries, used to configure the programmable IC. Device configuration 220 may include a hardware binary (e.g., a configuration bitstream), a boot image file for the processor system of the target programmable IC, an application binary corresponding to a user specified application to be executed on the processor system of the target programmable IC, or any combination thereof.

Once the configuration bitstream is generated and exported by the hardware design tool, design specification 210 executes a software design tool (e.g., PetaLinux Tool) that is capable of building and deploying a custom embedded Linux solution for execution on the target programmable IC. The software design tool is capable of importing output from the hardware design tool and building the kernel, an SDK, and a root file structure for the processor system.

If there is no user application available, design tools 212 may discontinue processing and output the device boot image files and the SDK. If a user application is specified, design specification 210 can be executed to build the user application using the SDK and output one or more application binaries.

FIG. 3 illustrates an example dialogue 300 between a user and the system of FIG. 1. Dialogue 300 may be presented within user interface 202, e.g., displayed by a chat client that is also capable of receiving user specified text inputs. In the example of FIG. 3, the system asks the user whether there is a design requirement. The user indicates that there is a design requirement to be met. Based on the user's response, the system queries the user for the particular device family (e.g., target programmable IC product line), name of the target programmable IC (e.g., model), and/or the particular circuit board on which the target programmable IC is disposed.

In this example, the user responds with a particular model of circuit board ZCU111. The system is capable of determining the particular target programmable IC in which the device configuration will be loaded based on the specified model of the circuit board. In this example, the target programmable IC is one that includes programmable logic connected to a hardwired processor system. The processor system includes one or more devices that may or may not be used with the programmable logic. For the specified target programmable IC, a user design may include only software to be executed by the processor system, a circuit design to be implemented in programmable logic, a circuit design that is implemented in programmable logic that utilizes one or more devices of the processor system, or any combination of the foregoing.

In the example of FIG. 3, the system asks the user whether the user design will utilize any programmable logic (PL) peripherals. The user responds affirmatively. The system responds to the user response by asking for the particular peripheral (e.g., device) that will be included in the user design. The user responds with "SPI," which is an acronym for "serial peripheral interface." The system recognizes the peripheral from the user's response. Further, the system is capable of recognizing that the SPI is a functional unit in the processor system as opposed to an element to be implemented in the programmable logic. As such, the processor system, whether the user intends on executing an application on the processor system as part of the user design or not, will require the processor system to be configured. The user need not be aware of such dependency.

In the example of FIG. 3, the system concludes the dialogue by asking the user for an electronic mail address to which the device configuration generated by the system may be sent. The system, for example, is capable of generating the necessary binary file(s) and sharing links to such files with the user. In this example, the sharing is performed via electronic mail, though the files may be shared with the user using any of a variety of known mechanisms.

FIG. 3 illustrates a simplified example dialogue between a user and the system. It should be appreciated that the level of complexity of the dialogue and the particular functionality requested by the user may vary from that illustrated in FIG. 3. Further example dialogues are described below illustrating other capabilities of the system.

In one example, the user may indicate during the dialogue that a video processing pipeline is desired. The chatbot is capable of interacting with the NLP to determine that further querying of the user is required as to the particular video functions that are desired by the user. For example, the chatbot may query the user as to the desired video resolution (e.g., 4K) or whether High Definition Multimedia Interface (HDMI) support is needed. The NLP is capable of determining, based on accessing the library, whether the requested features or functions are available. For example, the NLP can determine whether the library includes cores or processing flows (e.g., predetermined combinations of connected cores) that support the functions requested by the user (e.g., the features extracted from the dialogue).

In one aspect, the chatbot is capable of informing the user as to whether any requested functionality is or is not available. For example, the chatbot may determine, using the NLP, that there are no cores or processing flows capable of performing the requested functions. For example, if 4K is requested by the user and is not available from any of the cores in the library, the chatbot may notify the user that the requested functionality is not available. Similarly, if HDMI is requested by the user and the library includes no cores capable of receiving HDMI video data into the programmable IC and/or outputting HDMI video data from the programmable IC, the system may notify the user that the requested functionality is not available.

Within this disclosure, while dialogue with the user may be represented as a particular block in a flow diagram, it should be appreciated that the user may continue to carry on a dialogue with the system while the system performs other tasks. In this regard, the system may continue to respond to user requests received by way of dialogue. Accordingly, in another example, the user may continue to dialogue with the system subsequent to generation of the device configuration to ask the system for other types of information. The user may ask the system for a timing analysis. The chatbot may interact with the AI engine to retrieve a timing report from the hardware design tool. The chatbot may then provide the timing report to the user via the user interface. As another example, the user may ask the system how much of the total resources of the target programmable IC are consumed by the device configuration. The system may obtain the requested information from the hardware design tool.

In still another aspect, the system may be configured to identify user requested functionality for user designs. These user requests for functionality may be saved. The system is capable of aggregating user requests over a plurality of different users (e.g., features extracted from dialogues with multiple users) and provide the saved requests to the tool developers and/or core developers as feature requests. In one example, for any user requested functionality that is not available from the library, the system may save the user requested functionality, aggregate such requests from a plurality of users, and provide the user requests to developers capable of adding that functionality to the design tool(s) and/or developing the cores and/or processing flows that support the user requested functionality.

In general, the chatbot is capable of exposing any of a variety of details of the user design and/or parameters of the design tools. Exposure of sufficient details of the cores, connectivity, and/or data path of the user design, for example, would allow a user to request insertion of a particular core or cores at a particular point in the data path of the user design. For example, the user may request that "core A" be inserted into the user design with the input port of core A coupled to the output port of a first core already in the user design and the output port of core A connected to the input port of a second core also already in the user design. A user may also specify latency requirements for the user design during the dialogue.

In cases where the user has expertise in hardware design, the user may desire a particular parameterization for a particular core. In that case, during the dialogue, the user may request the particular core be included in the user design and further specify one or more parameters that will be used to parameterize the core.

Figure 4:
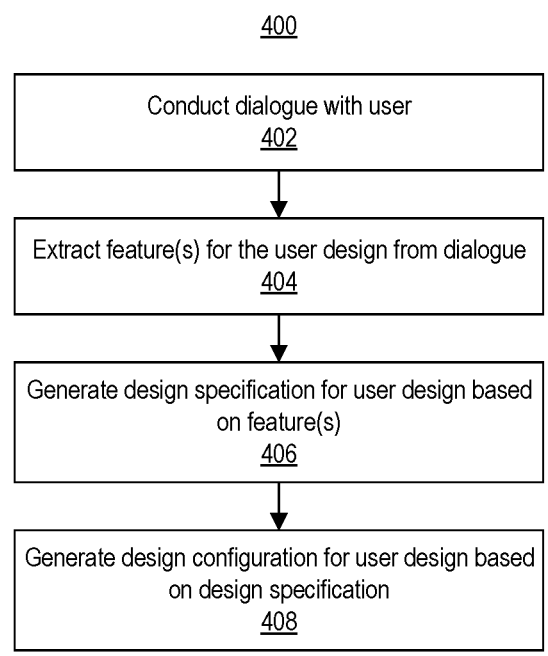
FIG. 4 illustrates an example method of operation for the system of FIG. 1.

FIG. 4 illustrates an example method 400 of operation for the system. In block 402, the system conducts a dialogue with the user. In block 404, the system extracts one or more features for the user design from the dialogue. Examples of features that may be extracted from the dialogue include, but are not limited to, cores to be used in the user design, connectivity of the cores, particular functional units of the processor system to be used, a user application to be compiled, timing constraints, power constraints, and/or other data that may be provided to a design tool.

In block 406, the system generates a design specification for the user design based on the extracted features. In block 408, the system generates a device configuration for the user design based on the design specification.

In accordance with the inventive arrangements described herein, the user may specify desired functionality for the user design without needing to know particular details relating to the architecture of the target programmable IC. For example, the user need not know any dependencies between desired functional units and/or cores for the target programmable IC. The AI engine may be programmed with the dependencies and account for the dependencies in the design specification that is generated. Referring to the example of FIG. 3, the AI engine recognizes that since the SPI is located in the processor system, in order to include the SPI in the user design, the processor system must be configured and, more particularly, the SPI must be configured via a hardware design flow performed by the hardware design tool.

The design tools, e.g., the hardware design tool, further is capable of evaluating connectivity of cores and configuring cores in the data path of the user design based on upstream and downstream connectivity. In other words, the hardware design tools, for example, may set the width of the input and/or output ports of a selected core in the data path of the user design to match the widths of the ports of upstream cores and/or widths of downstream cores connected to the respective ports of the selected core presuming such widths are supported by the selected core.

Figure 5:
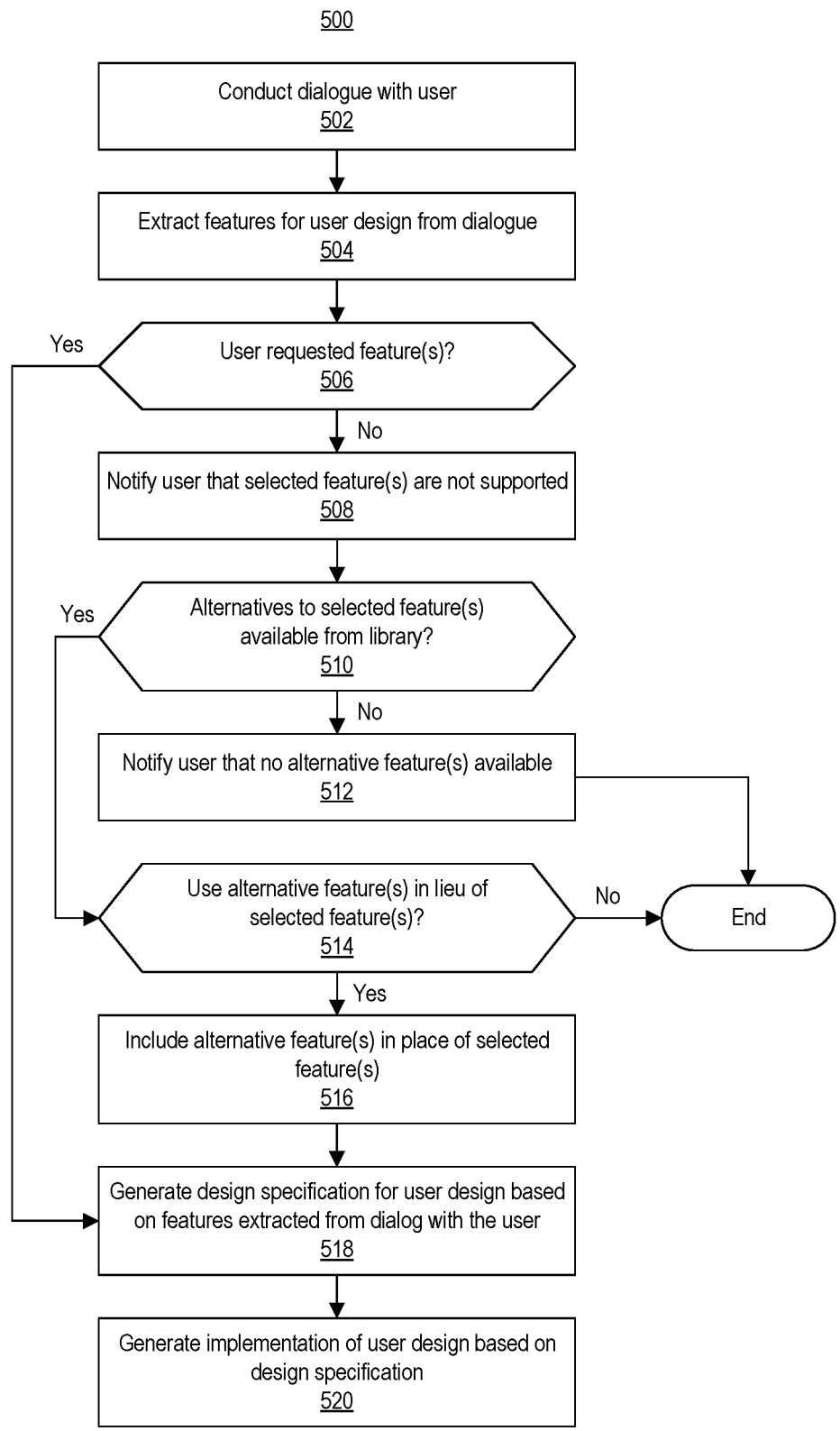
FIG. 5 illustrates another example method of operation for the system of FIG. 1.

FIG. 5 illustrates another example method 500 of operation for the system of FIG. 1. In the example of FIG. 5, the system is capable of evaluating whether user requested functionality is supported and may be implemented.

In block 502, the system conducts a dialogue with the user. In block 504, the system extracts one or more features for the user design from the dialogue. In block 506, the system determines whether the features extracted in block 504 are supported. The features extracted from the dialogue define the functionality requested by the user. For example, the system is capable of determining whether the extracted features are available from one or more cores in the library. The system is capable of querying the library to determine whether any of the cores or descriptions thereof included in the library match the extracted features.

The system determines, for example, that a feature is supported or available in response to detecting one or more cores that match the feature. An example of determining that the functionality is supported is where the system finds one or more cores having a description that includes or matches the extracted features. The system determines, for example, that a feature is not supported or available in response to determining that no core of the library matches the feature.

If the user requested feature(s) are supported, method 500 continues to block 518. If the user requested feature(s) are not supported, method 500 continues to block 508. For purposes of description, any features not found in the library are referred to as "selected features."

In block 508, the system notifies the user that the selected feature(s) are not supported. For example, the system notifies the user that the library does not support the selected feature(s) since no core(s) in the library are capable of performing the functionality indicated by the features. In illustration, if an extracted feature from the dialogue indicates that a particular video processing resolution is desired and that no core within the library is capable of processing video at the resolution indicated by the feature (e.g., 4K), the system notifies the user that the requested feature, e.g., 4K in this case, is not supported or available.

In block 510, the system optionally determines whether alternative feature(s) are available in lieu of the selected feature(s) from the library. Continuing with the prior example, the system may query the library for core(s) capable of processing video at different resolutions. The system, for example, using the NLP, is capable of determining the type of feature requested, e.g., video resolution, and querying for similar alternatives to the selected feature.

In response to determining that no alternatives are available in the library, method 500 continues to block 512. In block 512, the system notifies the user that no alternative feature(s) were found in block 510. After block 512, method 500 may end.

In response to determining that alternative feature(s) were found, method 500 continues to block 514. In block 514, the system is capable of querying the user whether to use the alternative feature(s) found in lieu of the selected feature(s). In response to a user input indicating to use the alternative feature(s), method 500 continues to block 516. In response to receiving a user input indicating not to use the alternative feature(s), method 500 may end.

As an illustrative and non-limiting example, the system may determine availability of a feature by comparing the required feature with the descriptions of available cores in the library. In one aspect, the features of cores in the library may be stored in a search friendly manner. For example, an HDMI Receiver Subsystem can be stored with keywords in the description such as "HDMI," "HDMI Rx," "HDMI Input," "Video Input," and/or "Video Input pipeline." The library may also store a list of other support cores required to complete a given stored core pipeline. For example, the library may store an indication that an HDMI Receiver Subsystem requires a Video PHY IP core for correct operation.

During search, if the user requires a design for an HDMI Video input pipeline, the system is capable of searching the library for the term "HDMI" inside the descriptions of cores and present the results to the user. The result may include the name of the available core(s) and description(s) of the functionality of the core(s). Further, the chatbot may provide a Weblink to a description of an available HDMI example design. From review of the example design, the user will obtain insight as to what the chatbot is going to add inside the user design.

In another example, the user may be looking for an SDI Video Input pipeline. The SDI Video Input pipeline is another video input interface, but may be one that is not currently supported by the system. In that case, the chatbot is capable of searching for "SDI" and/or "Video Input" inside the library. Since, HDMI is already listed with the "Video Input" tag inside the library, the system may return HDMI as an available option (e.g., an alternative in this example) to the user.

As discussed, while "conduct dialog with user" is listed in block 502, such dialogue may continue throughout the method illustrated in FIG. 5. For example, the user may continue to interact with the system by way of dialogue to provide inputs, ask for additional information, or the like throughout method 500.

In block 516, the system includes the alternative feature(s) found in block 510 in the user design in place of the selected feature(s). For example, the system may select cores that support the alternative features in implementing the user design.

In block 518, the system generates a design specification for the user design based on the features extracted from dialogue with the user. As discussed, the design specification may be implemented as one or more scripts that control operation of the design tools. For example, the system may generate a hardware script capable of controlling the hardware design tool that performs the hardware design flow. The hardware script, when executed by the system, is capable of invoking the hardware design tool, creating a project therein, instantiating the specified cores and connectivity in the project to create a circuit design, instantiating any functional units of the processor system, and initiating a design flow on the circuit design.

The system may also generate a software script capable of controlling the software design tool that performs the software design flow. The software script, when executed by the system, is capable of executing the software design tool, creating a project, and generating the necessary boot image file for the processor system of the programmable IC. The system may also generate an application script capable of controlling the application design tool that performs the application design flow. The application script, when executed by the system, is capable of executing the application design tool to compile a user application that was specified or indicated during the dialogue with the system.

In block 520, the system generates a device configuration of the user design based on the design specification. For example, the system executes the various scripts to generate the binary files used to configure the programmable IC. The binaries may include, depending on the particular portions of the programmable IC used by the user design, configuration data for configuring the programmable logic, a boot image file for booting the processor system, and/or an application that is executable by the processor system. As discussed, the system is capable of sharing the device configuration with the user via electronic mail, displaying a link to the file(s) in the chat client, or through another communication channel.

Figure 6:
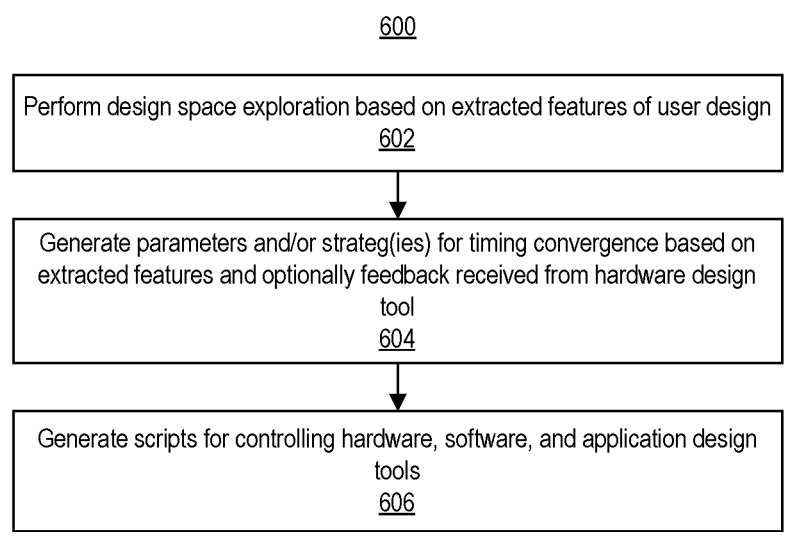
FIG. 6 illustrates another example method of operation for the system of FIG. 1.

FIG. 6 illustrates another example method 600 of operation for the system of FIG. 1. Method 600 illustrates example operations that may be performed by the AI engine as part of generating the design specification. Method 600 is directed to developing the portion of the user design implemented in programmable logic as this portion of the user design may drive other aspects of the user design relating to the processor system.

In block 602, the system performs design space exploration based on the extracted features of the user design. In one aspect, the system is capable of invoking the hardware design tool to perform the design space exploration. The system is capable of controlling the hardware design tool to generate different models of the hardware portion of the user design, evaluate each model, and provide the results back to the AI engine so that the AI engine may choose the particular model of the user design that is to be implemented as the circuit design.

In block 604, the system is capable of generating one or more parameters and/or strategies for timing convergence based on the extracted features and optionally any feedback that may be received from the hardware design tool performing the design exploration of block 602. For example, the AI engine is capable of determining one or more parameters (e.g., values for the parameters) for the cores to be used in the user design based on the features extracted from the dialogue. The parameters may be used to parameterize the cores. The parameter may be determined by the AI engine from the features extracted from the dialogue.

The AI engine is also capable of determining strategies for timing convergence. The strategies specify particular timing closure techniques that are performed by the hardware design tool at different stages of the hardware design flow. The strategies may be specified as configuration parameters for the design tools. The AI engine is capable of determining which strategies may be performed at each different stage of the hardware design flow and further specify an order in which such strategies may be performed. These parameter(s) and strategies may be specified in the hardware script for controlling the hardware design tool. As such, the hardware script, when executed, is capable of instantiating cores and parameterizing cores via the hardware design tool. Further, when timing is not met in a particular phase of the design flow, the hardware script dictates the strategy or strategies to be performed for that given phase and the order in which the strategies are to be performed to achieve timing closure.

In one aspect, the AI engine uses machine learning to determine the parameters and the strategies. For example, the AI engine may be trained on a library of test circuit designs and/or user circuit designs that are processed through the hardware design flow. The results in each stage of the hardware design flow, in relation to timing closure, may be analyzed and used to train the AI engine as to which strategies are more and less effective given the state of the circuit design, the phase of the design flow, and the architecture of the circuit design (e.g., timing paths). Similarly, the AI engine may be trained to determine the intended parameterization (e.g., parameters) of cores given a training corpus of text of user inputs.

In block 606, the system generates the scripts for controlling the design tools. Regarding the programmable logic portion of the user design, the system generates the hardware script to include the commands that instantiate the necessary cores in a project of the hardware design tool, parameterize the cores, specify connectivity, and specify the strategies to be used to close timing throughout the design flow. The system further generates the software script for the software design tool and the application script for the application design tool, if required.

Though not illustrated in FIG. 6, in another aspect, the system is capable of executing one or more of the scripts to obtain convergence data that may be fed back to the AI engine as part of an iterative process. For example, the AI engine may receive convergence data as feedback from the hardware design tool. The AI engine may receive results from the hardware design tool indicating whether timing closure was achieved or not. The system may incorporate the convergence data and perform design exploration again. The AI engine updates the script(s) to be used for the hardware design tool based on the convergence data, the extracted features from the dialogue with the user, and/or machine learning as previously described. In another aspect, the system may notify the user that timing closure is not achieved and query the user for acceptable alternatives such as relaxing timing constraints.

Figure 7:
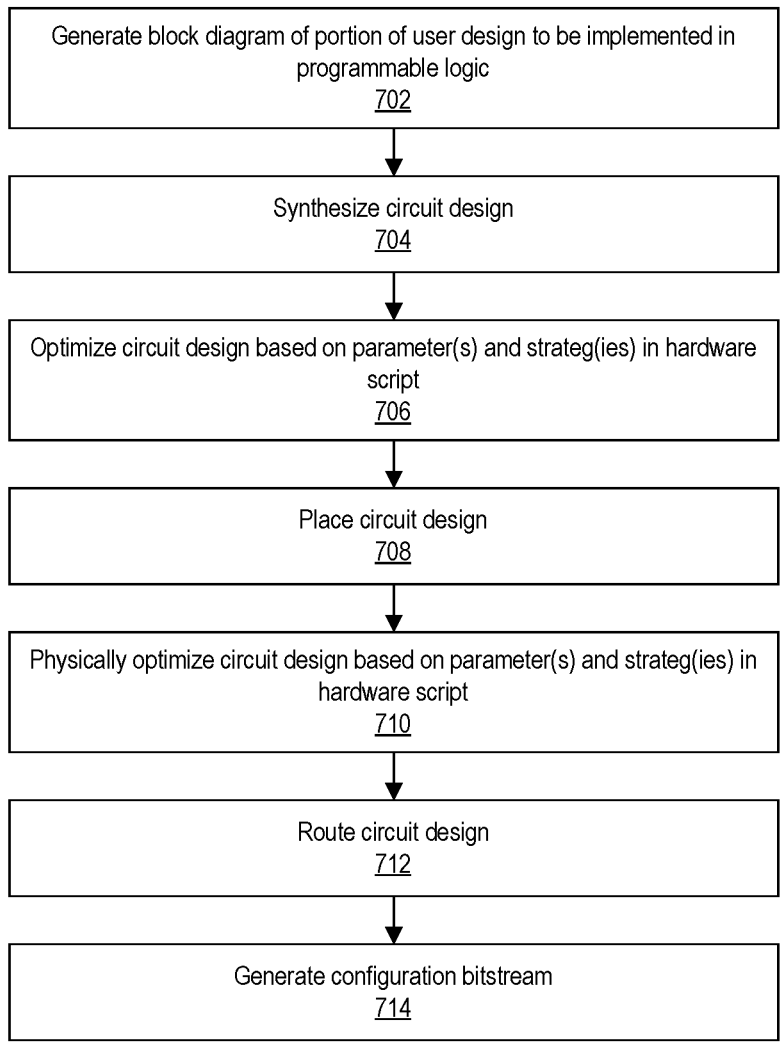
FIG. 7 illustrates an example method for performing a hardware design flow.

FIG. 7 illustrates an example method 700 for performing a hardware design flow. Method 700, for example, may be performed by the hardware design tool operating under control of the design specification, e.g., the hardware script.

In block 702, the hardware design tool generates a block diagram of the user design. The block diagram includes blocks representing functional units in the processor system and, if used in the user design, any blocks representing circuitry to be implemented in the programmable logic. For purposes of description, the portion of the user design operated on in the hardware design flow is referred to as the "circuit design." As noted, the hardware design flow is used to enable functional units in the processor system and to generate those portions of the user design to be implemented in programmable logic. The hardware script, in specifying the particular cores to be used whether in the processor system and/or the programmable logic, specifies a block diagram of the circuit design. The hardware design tool instantiates the block diagram in a project therein.

In block 704, the hardware design tool synthesizes the circuit design. In general, synthesis refers to the process of generating a gate-level netlist from a high-level description of a circuit or system such as a block diagram. In block 706, the hardware design tool optionally optimizes the circuit design based on the parameter(s) and/or the strategy or strategies contained in the hardware script for the synthesis phase of the design flow. In one aspect, though shown as a distinct step, block 706 may be performed as part of synthesis implemented in block 704.

In block 708, the hardware design tool places the circuit design. Placement refers to the process of assigning elements of the synthesized circuit design to particular instances of circuit blocks and/or resources having specific locations on the target IC. In block 710, the hardware design tool optionally physically optimizes the circuit design based on the parameter(s) and/or the strategy or strategies contained in the hardware script for the placement phase of the design flow.

In block 712, the hardware design tool routes the circuit design. Routing refers to the process of selecting or implementing particular routing resources, e.g., wires and/or other interconnect circuitry, to electrically couple the various circuit blocks of the target IC after placement.

In block 714, the hardware design tool is capable of generating a configuration bitstream. The configuration bitstream is a binary file used to configure the programmable logic to physically implement the circuit design therein. The configuration bitstream may also include any configuration data used to program or configure devices in the processor system that are used by the user design. As noted, the device configuration generated by the system for the user design includes the configuration bitstream.

In one aspect, the hardware design flow illustrated in FIG. 7 is capable of generating a hardware design file that may be shared with the software design tool. The hardware design file specifies the current state of the circuit design subsequent to synthesis, placement, and routing and may be read or used by other design tools.

Figure 8:
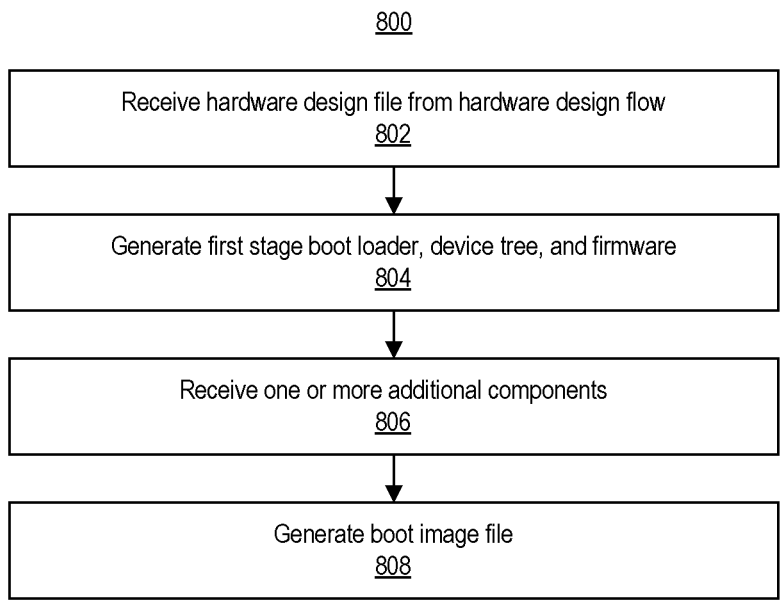
FIG. 8 illustrates an example method for performing a software design flow.

FIG. 8 illustrates an example method 800 for performing a software design flow. Method 800, for example, may be performed by the software design tool operating under control of the design specification, e.g., the software script.

In block 802, the software design tool receives the hardware design file from the hardware design flow. In block 804, the software design tool generates a first stage boot loader for the processor system, a device tree, and firmware for device bring up and management. The first stage boot loader (FSBL) is program code that is executed to load configuration bitstream(s) and configure the processing system of the programmable IC at boot time.

A "device tree" is a data structure for describing hardware. Rather than hard coding attributes of a hardware device (e.g., whether in programmable logic or a functional unit of the processor system) into certain operating systems, the attributes of the hardware device can be described in a data structure called a device tree. The device tree, for example, lists the various devices of the programmable IC (e.g., whether in the programmable logic or in the processor system) available to the operating system. The device tree is passed to the operating system at boot time. The device tree may be formatted as a tree of named nodes and properties where nodes contain properties and child nodes. Properties may be name-value pairs. The data structure can hold any kind of data. To be useful, the device tree is laid out in a structure that the operating systems understands. A "bindings" is a description of how a device is described in the device tree. Bindings for various devices are well established and documented.

The firmware may be trusted program code that is loaded into a platform management controller (PMC) included in the programmable IC. In one aspect, the PMC is responsible for booting the programmable IC and is independent of the processor system and the programmable logic. For example, the PMC may execute the firmware to provide the configuration bitstream(s) to the programmable logic and/or the FSBL to the processor system.

In block 806, the software design tool receives one or more additional components that are included in the boot image file. For example, the software design tool may obtain an executable image of the operating system and a primary boot loader. The software design tool may also obtain components such as the ARM Trusted Firmware (ATF) and RAMDisk. ATF provides a reference to secure software for selected ARM processor architectures, provides implementations of various interface standards (e.g., Power State Coordination Interface), and secure monitor code. Ram Disk is used for loading a temporary file system into memory in the boot process of the Linux kernel.

In block 808, the system generates the boot image file (e.g., boot.bin) for the processor system of the programmable IC. The boot image file includes the firmware, the FSBL, a primary boot loader, an executable image of the operating system, and the device tree. In some cases, a configuration bitstream may be included in the boot image file. The boot image file is a binary file used to boot the processor system of the programmable IC. As noted, the device configuration generated by the system for the user design may include the boot image file.

Within this specification, reference is made to particular operating systems (e.g., Linux) and/or particular processor architectures (e.g., ARM). It should be appreciated that such references are for purposes of illustration and not limitation. As such, to the extent that components and/or design tools noted herein are specific to such an operating system, processor architecture, or embedded system (e.g., FIG. 10), it should be appreciated that other comparable component and/or design tool alternatives may be used when implementations utilize other operating systems, processor architectures, and/or IC architectures.

Figure 9:
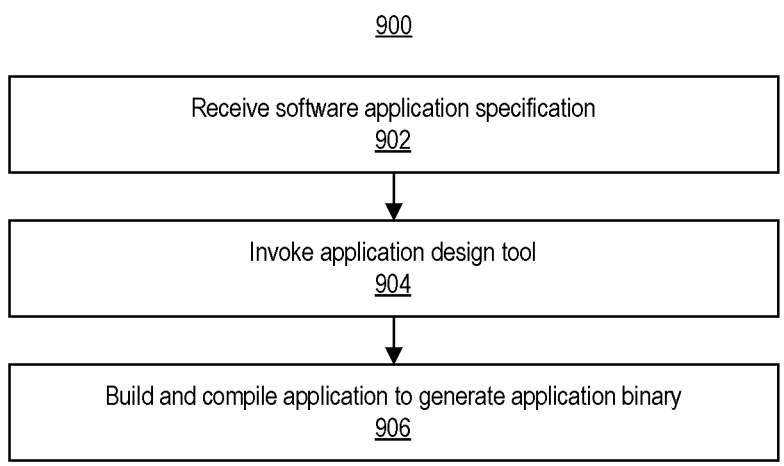
FIG. 9 illustrates an example method for performing an application design flow.

FIG. 9 illustrates an example method 900 for performing an application design flow. Method 900, for example, may be performed, at least in part, by the application design tool operating under control of the design specification, e.g., the application script.

In block 902, the system receives the user's application. For example, during the dialogue with the user, the system may determine a particular application to be included in the user design. The user may provide a path or file name of the source code of the user's application. In block 904, the system invokes the application design tool to process the application. In block 906, the application design tool is capable of building and compiling the user application to generate an application binary.

The application binary is a binary file specifying the user's application and is executable by the processor system of the programmable IC. As noted, the device configuration generated by the system for the user design may include the application code binary. The processor system may be configured using the boot image file in combination with the application binary.

Figure 10:
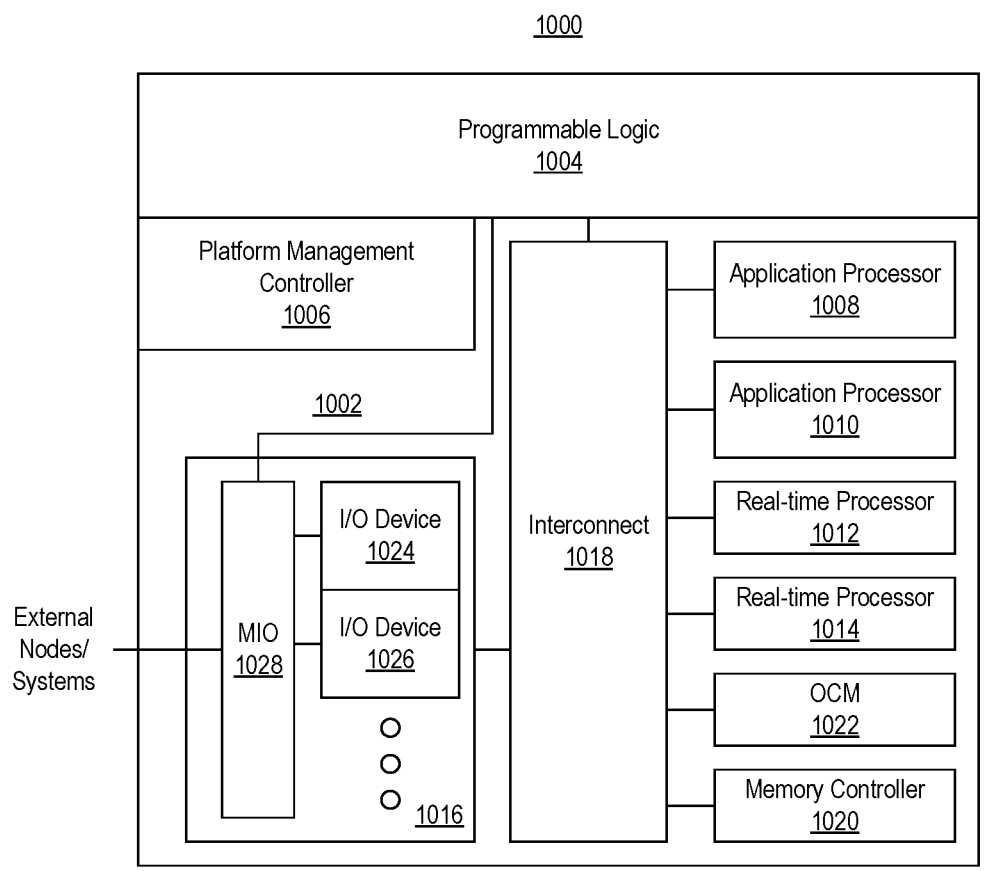
FIG. 10 illustrates an example architecture for an integrated circuit (IC).

FIG. 10 illustrates an example architecture 1000 for an IC. In one aspect, architecture 1000 may be implemented within a programmable IC. For example, architecture 1000 may be used to implement a field programmable gate array (FPGA). Architecture 1000 may also be representative of a systemon-chip (SoC) type of IC. An SoC is an IC that includes a processor that executes program code and one or more other circuits. The other circuits may be implemented as hardwired circuitry, programmable logic, and/or a combination thereof. The circuits may operate cooperatively with one another and/or with the processor.

In the example of FIG. 10, architecture 1000 includes a processor system 1002, programmable logic 1004, and a PMC 1006. Processor system 1002 is a region of hardwired circuitry that includes one or more processors capable of executing program code. The term "hardwired" refers to a region of circuitry in an IC with a fixed topology. For example, the connectivity among the blocks illustrated in processor system 1002 is not changeable unlike circuit blocks in programmable logic 1004. Notwithstanding the fixed topology, circuit blocks in processor system 1002 may be programmed or configured with data to operate in different modes and/or be turned on or off.

In the example of FIG. 10, processor system 1002 includes a variety of different processors such as application processors 1008, 1010 and real-time processors 1012, 1014. The different processors shown are physically distinct instances that may have different architectures (use different instructions sets). For example, application processors 1008, 1010 may have a same architecture. Real-time processors 1012, 1014 may have the same architecture, but one that differs from application processors 1008, 1010. Application processors 1008, 1010 are capable of executing user applications. Real-time processors 1012, 1014 are capable of executing user applications requiring real-time performance such as automotive, mass storage, mobile baseband, medical, and/or industrial applications. Though not illustrated in FIG. 10, application processors 1008, 1010 and real-time processors 1012, 1014 may be directly connected to programmable logic 1004.

Processor system 1002 may include an input/output (I/O) subsystem 1016, interconnect 1018, a memory controller 1020, and on-chip memory (OCM) 1022. In the example of FIG. 10, interconnect 1018 is coupled to application processors 1008, 1010, real-time processors 1012, 1014, OCM 1022, and memory controller 1020. In one aspect, interconnect 1018 is implemented as an on-chip interconnect. An example of an on-chip interconnect is an Advanced Microcontroller Bus Architecture (AMBA) eXtensible Interface (AXI) bus. An AMBA AXI bus is an embedded microcontroller bus interface for use in establishing on-chip connections between circuit blocks and/or systems. Other example implementations of an interconnect may include, but are not limited to, buses, cross-bars, network on chips (NoCs), switches, and so forth.

I/O subsystem 1016 includes a plurality of I/O devices 1024, 1026. I/O subsystem 1016 may include more than two I/O devices. Each of I/O devices 1024, 1026 is coupled to a multiplexer I/O (MIO) 1028. Examples of I/O devices 1024, 1026 include, but are not limited to, a universal asynchronous receiver/transmitter (UART), Universal Serial Bus (USB), and an SPI. MIO 1028 is configurable to provide processor system 1002 and/or programmable circuitry 1004 with access to external (e.g., off-chip) nodes and/or systems. MIO 1028 may be configured on a per pin basis and may facilitate concurrent access to I/O devices 1024, 1026 by processor system 1002 and/or programmable circuitry 1004. I/O subsystem 1016 may include more than two I/O devices. In the example of FIG. 10, functional units of processor system 1002 include, but are not limited to, I/O devices 1024, 1026, memory controller 1020, MIO 1028, and/or interconnect 1018.

Programmable logic 1004 is circuitry that may be programmed to perform specified functions. As an example, programmable logic 1004 may be implemented as field programmable gate array type of circuitry. Programmable logic 1004 can include an array of programmable circuit blocks. As defined herein, the term "programmable logic" means circuitry with a configurable topology used to build reconfigurable digital circuits. Programmable logic is formed of many programable circuit blocks sometimes referred to as "tiles" that provide basic functionality. The topology of programmable logic 1004 is highly configurable unlike the hardwired circuitry of processor system 1002. Each programmable circuit block of programmable logic 1004 typically includes a programmable element (e.g., a functional element) and a programmable interconnect. The programmable interconnects provide the highly configurable topology of programmable logic 1004. The programmable interconnects may be configured on a per wire basis to provide connectivity among the programmable elements of the programmable circuit blocks of programmable logic 1004 and is configurable on a per-bit basis (e.g., where each wire conveys a single bit of information).

Examples of programmable circuit blocks of programmable logic 1004 include configurable logic blocks having look-up tables and registers. Unlike hardwired circuitry, these programmable circuit blocks have an undefined function at the time of manufacture. Programmable logic 1004 may include other types of programmable circuit blocks that have also provide basic and defined functionality with more limited programmability. Examples of these circuit blocks may include digital signal processing blocks (DSPs), phase lock loops (PLLs), and block random access memories (BRAMs). These types of programmable circuit blocks, like others in programmable logic 1004, are numerous and intermingled with the other programmable circuit blocks of programmable logic 1004. These circuit blocks also have an architecture that generally includes a programmable interconnect and a programmable element and, as such, are part of the highly configurable topology of programmable logic 1004.

Prior to use, programmable logic 1004, e.g., the programmable interconnect and the programmable elements, must be programmed or "configured" by loading data referred to as a configuration bitstream into internal configuration memory cells therein. The configuration memory cells, once loaded with a configuration bitstream, define how programmable logic 1004 is configured, e.g., the topology, and operates (e.g., particular functions performed). Within this disclosure, a "configuration bitstream" is not equivalent to program code executable by a processor or computer.

PMC 1006 is implemented as a hardwired circuit block that is responsible for managing certain aspects of architecture 1000. For example, PMC 1006 is responsible for booting architecture 1000. PMC 1006 may include one or more processors configured to execute the firmware received as part of a boot image file. In executing the firmware, PMC 1006 is capable of providing the configuration bitstream to programmable logic 1004 for configuration thereof and providing the software binary and application binary to processor system 1002 for execution. As discussed, certain functional units included in processor system 1002, e.g., I/O devices 1024, 1026, memory controller 1020, MIO 1028, and/or interconnect 1018 are configured from the configuration bitstream.

The following is a general description of a boot flow for an IC having an architecture as illustrated in FIG. 10. It should be appreciated, however, that the boot flow may vary depending upon the complexity of the actual device that is implemented. The variation in the boot flow may arise from the sequence in which the modules (hardware modules and/or subsystems) on the IC are powered on and/or the way boot images are bundled together.

During an initial power-up stage, hardware state machines in the PMC 1006 are capable of performing one or more tasks to prepare ROM within PMC 1006 for execution. During a PMC boot stage, a processor within PMC 1006 is reset and then released, whereby the processor executes code pre-stored in the ROM within PMC 1006. The processor prepares the PMC 1006 for accessing a boot device (e.g., an SD card or other external memory from which a boot image may be obtained).

PMC 1006 is capable of next performing a firmware validation stage where the processor in PMC 1006, based on a setting of particular pins that may have been captured earlier, starts to load and validate a boot image file. The processor loads firmware from the boot image file into a RAM in PMC 1006. Once loaded and validated, the processor of PMC 1006 continues execution of the firmware to configure different subsystems of the IC such as PS 1002, PL 1004, and/or other subsystems that may be included in the IC. Each subsystem may be configured using a corresponding partition from the boot image file.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit. The hardware circuit may be configured to carry out instructions contained in program code. The hardware circuit may be an integrated circuit.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method includes conducting, using computer hardware, a dialogue with a user, wherein the dialogue describes a user design for a programmable integrated circuit, extracting, using the computer hardware, a first plurality of features for the user design from the dialog, and generating, using the computer hardware, a design specification for the user design based on the first plurality of features. The method also includes generating, using the computer hardware, a device configuration for the user design based on the design specification. The device configuration is loadable within the programmable integrated circuit to implement the user design.

The foregoing and other implementations can each optionally include one or more of the following features, alone or in combination. In particular, one implementation includes all the following features in combination.

In another aspect, generating the device configuration includes controlling operation of a plurality of software-based design tools by executing the design specification.

Extracting the first plurality of features for the user design includes detecting a plurality of cores specified by the dialog and determining connectivity among the plurality of cores.

The method may include providing a library of a plurality of cores available for creating the device configuration within the programmable integrated circuit and determining whether a selected feature of the first plurality of features is available from the plurality of cores of the library.

In response to determining that the function is not available from the plurality of cores of the library, the method includes notifying the user that the selected feature is not supported during the dialog.

The method may include, during the dialog, notifying the user of an alternative feature for the selected feature that is available from the library.

In another aspect, the dialogue is ongoing and the method includes receiving, during the dialog, a request for information about an implementation of the user design, determining the information from the implementation of the user design, and providing, during the dialog, the information to the user.

In another aspect, the method includes aggregating the first plurality of features and a second plurality of features extracted from a dialogue with at least one other user and providing the aggregated features as feature requests.

The aggregating may be performed only for selected features of the first plurality of features and the second plurality of features that are not available from a library of a plurality of cores available for creating the device configuration.

In another aspect, a system having a processor is capable of initiating and/or performing the foregoing operations. In still another aspect, a computer program product includes a computer readable storage medium having program code stored thereon, wherein the program code is executable by a processor to perform the foregoing operations.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   conducting, using a computer hardware, a dialogue with a user, wherein the dialogue describes a user design for a programmable integrated circuit;
   extracting, using the computer hardware, a first plurality of features for the user design from the dialog, wherein the first plurality of features specifies one or more cores and one or more values of customizable parameters for the one or more cores;
   generating, using the computer hardware, a design specification for the user design based on the first plurality of features;
   wherein the design specification specifies the one or more cores and the one or more values of customizable parameters for the one or more cores, and wherein the design specification is executable to control a plurality of computer-based design tools; and
   generating a device configuration for the user design by performing a hardware design flow using the plurality of computer-based design tools operating under control of the design specification, wherein the design specification includes the one or more cores having the customizable parameters for the one or more cores set to the one or more values, and wherein the device configuration is loadable within the programmable integrated circuit to implement the user design.

2. The method of claim 1, wherein at least one of the plurality of computer-based design tools operating under control of the design specification performs a software design flow.

3. The method of claim 1, wherein the extracting the first plurality of features for the user design comprises:
   detecting the one or more cores and the one or more values of customizable parameters for the one or more cores from the dialog; and
   determining connectivity among the plurality of cores.

4. The method of claim 1, further comprising:
   providing a library of a plurality of cores available for creating the device configuration within the programmable integrated circuit; and
   determining whether a selected feature of the first plurality of features is available from the plurality of cores of the library.

5. The method of claim 4, further comprising:
   in response to determining that the function is not available from the plurality of cores of the library, notifying the user that the selected feature is not supported during the dialog.

6. The method of claim 5, further comprising:
   during the dialog, notifying the user of an alternative feature for the selected feature that is available from the library.

7. The method of claim 1, wherein the dialogue is ongoing, the method further comprising:
   receiving, during the dialog, a request for information about an implementation of the user design;
   determining the information from the implementation of the user design; and
   providing, during the dialog, the information to the user.

8. The method of claim 1, further comprising:
   aggregating the first plurality of features and a second plurality of features extracted from a dialogue with at least one other user; and
   providing the aggregated features as feature requests.

9. The method of claim 1, wherein at least one of the plurality of computer-based design tools operating under control of the design specification performs an application design flow.

10. A system, comprising:
    a processor configured to initiate operations including:
    conducting a dialogue with a user, wherein the dialogue describes a user design for a programmable integrated circuit;
    extracting a first plurality of features for the user design from the dialog, wherein the first plurality of features specifies one or more cores and one or more values of customizable parameters for the one or more cores;
    generating a design specification for the user design based on the first plurality of features;
    wherein the design specification specifies the one or more cores and the one or more values of customizable parameters for the one or more cores, and wherein the design specification is executable to control a plurality of computer-based design tools; and
    generating a device configuration for the user design by performing a hardware design flow using the plurality of computer-based design tools operating under control of the design specification, wherein the design specification includes the one or more cores having the customizable parameters for the one or more cores set to the one or more values, and wherein the device configuration is loadable within the programmable integrated circuit to implement the user design.

11. The system of claim 10, wherein at least one of the plurality of computer-based design tools operating under control of the design specification performs a software design flow.

12. The system of claim 10, wherein the extracting the first plurality of features for the user design comprises:
    detecting the one or more cores and the one or more values of customizable parameters for the one or more cores from the dialog; and
    determining connectivity among the plurality of cores.

13. The system of claim 10, wherein the processor is configured to initiate operations further comprising:
    providing a library of a plurality of cores available for creating the device configuration within the programmable integrated circuit; and
    determining whether a selected feature of the first plurality of features is available from the plurality of cores of the library.

14. The system of claim 13, wherein the processor is configured to initiate operations further comprising:
    in response to determining that the selected feature is not available from the plurality of cores of the library, notifying the user that the selected feature is not supported during the dialog.

15. The system of claim 14, wherein the processor is configured to initiate operations further comprising:

during the dialog, notifying the user of an alternative feature for the selected feature that is available from the library.

16. The system of claim 10, wherein the dialogue is ongoing and the processor is configured to initiate operations further comprising:

receiving, during the dialog, a request for information about an implementation of the user design;

determining the information based on the implementation of the user design; and providing, during the dialog, the information to the user.

17. The system of claim 10, wherein the processor is configured to initiate operations further comprising:

aggregating the first plurality of features and a second plurality of features extracted from a dialogue with at least one other user; and providing the aggregated features as feature requests.

18. The system of claim 17, wherein at least one of the plurality of computer-based design tools operating under control of the design specification performs an application design flow.

19. A computer program product, comprising:

a non-transitory computer readable storage medium having program code stored thereon, wherein the program code is executable by computer hardware to initiate operations including:

conducting a dialogue with a user, wherein the dialogue describes a user design for a programmable integrated circuit;

extracting a first plurality of features for the user design from the dialog, wherein the first plurality of features specifies one or more cores and one or more values of customizable parameters for the one or more cores;

generating a design specification for the user design based on the first plurality of features;

wherein the design specification specifies the one or more cores and the one or more values of customizable parameters for the one or more cores, and wherein the design specification is executable to control a plurality of computer-based design tools; and generating a device configuration of the user design by performing a hardware design flow using the plurality of computer-based design tools operating under control of the design specification, wherein the design specification includes the one or more cores having the customizable parameters for the one or more cores set to the one or more values, and wherein the device configuration is loadable within the programmable integrated circuit to implement the user design.

20. The computer program product of claim 19, wherein the extracting the first plurality of features for the user design comprises:

detecting the one or more cores and the one or more values of customizable parameters for the one or more cores from the dialog; and determining connectivity among the plurality of cores.

* * * * *